United States Patent
He

(10) Patent No.: US 10,817,290 B2
(45) Date of Patent: Oct. 27, 2020

(54) METHOD AND SYSTEM FOR A MACHINE VISION INTERFACE

(71) Applicant: Zebra Technologies Corporation, Lincolnshire, IL (US)

(72) Inventor: Duanfeng He, South Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 90 days.

(21) Appl. No.: 16/225,167

(22) Filed: Dec. 19, 2018

(65) Prior Publication Data

US 2020/0201631 A1 Jun. 25, 2020

(51) Int. Cl.
| | |
|---|---|
| *G06F 9/30* | (2018.01) |
| *G06T 1/00* | (2006.01) |
| *H04N 5/225* | (2006.01) |
| *H04N 5/235* | (2006.01) |
| *G06T 7/60* | (2017.01) |

(52) U.S. Cl.
CPC ........ *G06F 9/30029* (2013.01); *G06T 1/0014* (2013.01); *G06T 7/60* (2013.01); *H04N 5/2256* (2013.01); *H04N 5/2354* (2013.01)

(58) Field of Classification Search
CPC ....... G06T 7/60; G06T 1/0014; H04N 5/2256; H04N 5/2354
USPC ........................................... 382/100
See application file for complete search history.

(56) References Cited

U.S. PATENT DOCUMENTS

| | | | | |
|---|---|---|---|---|
| 2004/0184648 A1* | 9/2004 | Zhang | ..................... | G06T 7/586 382/141 |
| 2008/0285020 A1* | 11/2008 | Gaessler | ............ | G01N 21/8806 356/237.2 |
| 2009/0003815 A1* | 1/2009 | Polidor | ..................... | G02B 7/32 396/106 |
| 2016/0065938 A1* | 3/2016 | Kazemzadeh | ....... | H04N 5/2258 348/46 |
| 2019/0082961 A1* | 3/2019 | Khodadad | ............ | A61B 5/0075 |

* cited by examiner

*Primary Examiner* — CongVan Tran
(74) *Attorney, Agent, or Firm* — Yuri Astvatsaturov

(57) ABSTRACT

A method is disclosed which includes illuminating one or more objects when they enter a field of view (FOV). The method includes capturing an image of one or more objects once they enter the FOV, and performing an iterative analysis of the image based on a plurality of detection operations and according to one or more sequential operational relationships and one or more logical operational relationships. The iterative analysis comprises analyzing the image according to a first detection operation, modifying one or more geometrical operational relationships, and modifying a second detection operation based on the one or more sequential operational relationships, the one or more logical operational relationships, and the one or more geometrical operational relationships. The method further includes repeating the iterative analysis until a final detection operation is completed, and sending a signal to an exterior component to perform an action corresponding to the one or more objects.

18 Claims, 3 Drawing Sheets

METHOD AND SYSTEM FOR A MACHINE VISION INTERFACE

BACKGROUND OF THE INVENTION

Machine vision systems traditionally use multiple stages of image processing to achieve a desired result. Several processing techniques are well known, and may include, for example, segmentation, edge detection, pattern recognition, and machine learning.

However, these processing techniques can be time intensive, inefficient, and inconsistent. A driving force behind this slow, inefficient, and inconsistent process is the myriad of avenues a particular algorithm may take to process any given image. Moreover, as indicated above, the amount of processing techniques currently in use only expands the potential for inconsistent results because the various techniques have not been programmed with any uniformity. In short, the processing techniques employed in machine vision systems are unreliable.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
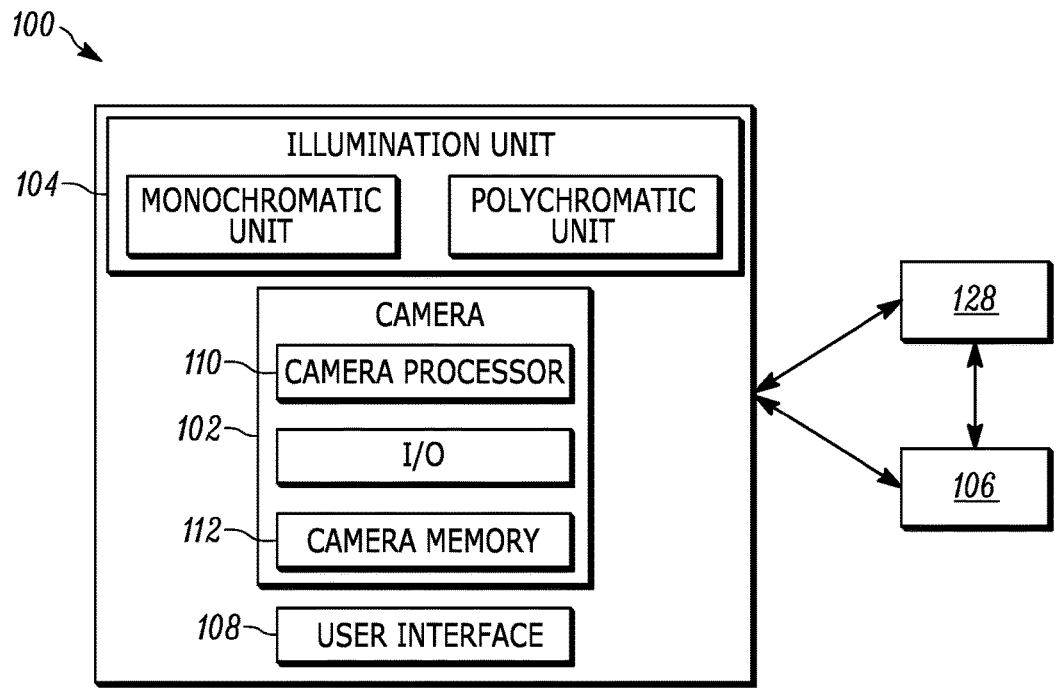
FIG. 1A illustrates an example system for a machine vision interface in accordance with various embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One way to alleviate the problems associated with the time-intensive, inefficient, and inconsistent processing techniques of machine vision systems is to simplify the processing technique's algorithmic structure. Generally speaking, there are at least three relationships that can be defined for a machine vision system: sequential relationships, logical relationships, and geometric relationships.

In many processing techniques, embodied as a processing algorithm, multiple processing steps are performed in a particular order, referred to as a sequence. Sequential relationships describe the particular sequence in which the processing steps are performed.

In order for a processing algorithm to function, a logical connection must exist between a current processing step and a subsequent processing step for the process to continue. Logical relationships establish the connection between each current processing step and each subsequent processing step. In other words, if the processing algorithm cannot complete a current processing step, the logical relationship between the current processing step and a subsequent processing step will determine if the processing technique will continue its analysis.

Finally, processing algorithms in machine vision systems attempt to analyze the visual aspects of captured images. This analysis is benefited by an understanding of the geometric relationships shared by the physical structures embodied in the image.

If these three relationships are integrated into a machine vision system to each independently and collectively inform the logical pathway of the algorithm, the user experience will improve, and the likelihood of having design errors will diminish.

For example, in analyzing an image of a structure, a machine vision system may identify a window. In doing so, the sequential relationships and logical relationships of the particular processing algorithm corresponding to the machine vision system may determine that (1) the sequence must continue to the next step because the window was successfully identified (i.e., the logical relationship is by default assumed to be AND, meaning that the task's requirement is assumed to include the successful detection of BOTH this and the next step) and (2) the next step in the sequence is to search for a door (i.e., the sequential relationship).

Once the machine vision system has made this determination, the algorithm would benefit from understanding where a door would likely be located based on the known location of the window. In other words, once the window is found, the algorithm may adjust its search strategy for the door to correspond with the known location of the window.

In accordance with various embodiments of the present disclosure, a method, and related system, are described for a machine vision interface. The method, and related system, of the present disclosure provide solutions where, e.g., a machine vision system needs to be faster, more efficient, and more consistent with its image analysis and processing.

Accordingly, in various embodiments herein, a method and system for a machine vision interface are disclosed. For example, a method of the present disclosure may include illuminating one or more objects when the one or more objects enters an optical field of view (FOV). In various embodiments, the illumination used may be monochromatic, polychromatic, or a combination of the two.

The method further includes capturing an image of one or more objects when the one or more objects enters the FOV. In various embodiments, the image may be captured by a camera. Additionally, the camera may include one or more processors and a memory containing one or more databases.

The method further includes performing, by one or more processors, an iterative analysis of the image based on a plurality of detection operations and according to one or more sequential operational relationships and one or more logical operational relationships. The plurality of detection operations are stored on a memory containing one or more databases.

In various embodiments, the one or more sequential operational relationships include a sequence in which the plurality of detection operations will execute, and the sequence is configured to be changed by a user.

The method further includes an iterative analysis comprising analyzing the image according to a first detection operation to obtain a first detection outcome. The method then includes modifying one or more geometrical operational relationships based on the first detection outcome, and modifying a second detection operation based on the one or more sequential operational relationships, the one or more logical operational relationships, and the one or more geometrical operational relationships.

In various embodiments, the one or more logical operational relationships include a logic gate between the first detection operation and the second detection operation, the logic gate is configured to be changed by a user between an AND logic state and an OR logic state, and the logic gate includes a default state corresponding to the AND logic state. In these embodiments, the method further includes skipping the second detection operation when the logic gate is in the default state and the first detection outcome indicates a failed detection corresponding to the first detection operation. Additionally, in these embodiments, the method further includes executing the second detection operation when at least one of: the logic gate is in the default state and the first detection outcome indicates a successful detection corresponding to the first detection operation; or the user changes the logic gate to the OR logic state and the first detection outcome indicates an unsuccessful detection corresponding to the first detection operation.

In various embodiments, the one or more geometrical operational relationships include (i) a first area of interest corresponding to the first detection operation and (ii) a second area of interest corresponding to the second detection operation, the first area of interest corresponds to a first geometrical region of the one or more objects, and the second area of interest corresponds to a second geometrical region of the one or more objects. In these embodiments, the method further includes modifying the second geometrical region according to each of a first location and a first orientation when the logic gate is in the default state and the first detection outcome indicates a successful detection corresponding to the first detection operation. Additionally, in these embodiments, the first geometrical region includes each of the first location and the first orientation. In these embodiments, it should be understood that the first location and the first orientation are descriptive of a specific location and orientation, respectively, of the one or more objects identified in the first detection operation.

The method further includes repeating the iterative analysis of the image until a final detection operation is completed. The iterative analysis of the image analyzes the image according to the second detection operation from a prior iteration of the iterative analysis, and the analysis of the final detection operation produces a final detection outcome.

The method further includes sending a signal to an exterior component to perform an action corresponding to the one or more objects based on the final detection outcome. In various embodiments, the exterior component is an actuator.

In another embodiment, a system of the present disclosure includes a camera configured to capture an image of one or more objects when the one or more objects enters an optical FOV. In various embodiments, the camera may include one or more processors and a memory including one or more databases.

The system further includes the memory including one or more databases and an illumination unit configured to provide illumination of the one or more objects once the one or more objects enters the optical FOV. In various embodiments, the illumination unit may be configured to provide monochromatic illumination, polychromatic illumination, or a combination of the two.

The system further includes one or more processors. The one or more processors are configured to receive the image of the one or more objects from the camera, receive a plurality of detection operations from the memory, and perform an iterative analysis of the image based on the plurality of detection operations and according to one or more sequential operational relationships and one or more logical operational relationships.

In various embodiments, the one or more sequential operational relationships include a sequence in which the plurality of detection operations will execute, and the sequence is configured to be changed by a user.

The system further includes the iterative analysis which comprises analyzing the image according to a first detection operation to obtain a first detection outcome, modifying one or more geometrical operational relationships based on the first detection outcome, and modifying a second detection operation based on the one or more sequential operational relationships, the one or more logical operational relationships, and the one or more geometrical operational relationships.

In various embodiments, the one or more logical operational relationships include a logic gate between the first detection operation and the second detection operation wherein the logic gate is configured to be changed by a user between an AND logic state and an OR logic state, and the logic gate includes a default state corresponding to the AND logic state. In these embodiments, the system further includes skipping the second detection operation when the logic gate is in the default state and the first detection outcome indicates a failed detection corresponding to the first detection operation. Additionally, these embodiments include executing the second detection operation when at least one of: the logic gate is in the default state and the first detection outcome indicates a successful detection corresponding to the first detection operation, or the user changes the logic gate to the OR logic state, and the first detection outcome indicates an unsuccessful detection corresponding to the first detection operation.

In various embodiments, the one or more geometrical operational relationships may include (i) a first area of interest corresponding to the first detection operation and (ii) a second area of interest corresponding to the second detection operation. In these embodiments, the first area of interest corresponds to a first geometrical region of the one or more objects, and the second area of interest corresponds to a second geometrical region of the one or more objects. Additionally, these embodiments include modifying the second geometrical region according to each of a first location and a first orientation when the logic gate is in the default state and the first detection outcome indicates a successful detection corresponding to the first detection operation, and the first geometrical region includes each of the first location and the first orientation. In these embodiments, it should be understood that the first location and the first orientation are descriptive of a specific location and orientation, respectively, of the one or more objects identified in the first detection operation.

The one or more processors of the system are further configured to repeat the iterative analysis of the image until a final detection operation is completed. The iterative analysis of the image analyzes the image according to the second detection operation from a prior iteration of the iterative analysis, and the analysis of the final detection operation produces a final detection outcome.

The one or more processors of the system are further configured to send a signal to an exterior component to perform an action corresponding to the one or more objects based on the final detection outcome. In various embodiments, the exterior component is an actuator.

FIG. 1A illustrates an example system 100 for a machine vision interface in accordance with various embodiments disclosed herein. System 100 includes a camera 102 configured to capture an image of one or more objects 106 once the one or more objects 106 enters an optical FOV. The camera 102 may be a monochromatic camera, a polychromatic camera, or a camera with both monochromatic and polychromatic imaging capabilities. In various embodiments, the optical FOV may be defined by an optical FOV of the camera 102, an optical FOV of the illumination unit 104, or an optical FOV of both the camera 102 and the illumination unit 104.

The camera 102, as illustrated in FIG. 1A, is housed inside the system 100, but it should be understood that the camera 102 can be located in any position such that the camera 102 can capture an image of the one or more objects 106 once the one or more objects 106 enters the optical FOV.

The camera 102 includes a camera processor 110. The camera processor 110 is configured to receive a captured image from the camera 102, receive a plurality of detection operations from the camera memory 112, and perform an iterative analysis of the image, as further discussed below in reference to FIGS. 1B and 3. The camera processor 110 is further configured to repeat the iterative analysis of the image until a final detection operation is completed, and send a signal to the exterior component 128, as further discussed below in reference to FIGS. 1B and 3.

As illustrated in FIG. 1A, the camera processor 110 includes a single processor, but it should be understood that the camera processor 110 may include multiple processors. Additionally, the camera processor 110 is illustrated as housed inside the camera 102, but in various embodiments, the camera processor 110 may be housed externally to the camera 102.

The camera 102 further includes a camera memory 112. The camera memory 112 includes one or more databases, as further discussed below in reference to FIG. 1B. As illustrated in FIG. 1A, the camera memory 112 includes a single memory, but it should be understood that the camera memory 112 may include multiple memories. Additionally, the camera memory 112 is illustrated as housed inside the camera 102, but in various embodiments, the camera memory 112 may be housed externally to the camera 102.

The system 100 also includes an illumination unit 104. The illumination unit 104 is configured to provide illumination of the one or more objects 106 once the one or more objects 106 enters the optical FOV. The illumination unit 104 is synced with the camera 102 such that once the one or more objects 106 enters the optical FOV, both the illumination unit 104 and the camera 102 activate to perform their respective operations. Additionally, the illumination unit may be configured to emit monochromatic light, polychromatic light, or a combination of both (as illustrated in FIG. 1A).

The system 100 also includes a user interface 108. Through the user interface 108, a user may change the plurality of detection operations, the one or more sequential operational relationships, the one or more logical operational relationships, and the one or more geometrical operational relationships.

The system 100 is communicatively coupled with both one or more objects 106 and an exterior component 128. The exterior component 128 is also communicatively coupled with the one or more objects 106 such that it is configured to perform an action corresponding to the one or more objects 106 based on a final detection outcome, as further discussed below in reference to FIG. 3.

Figure 1B:
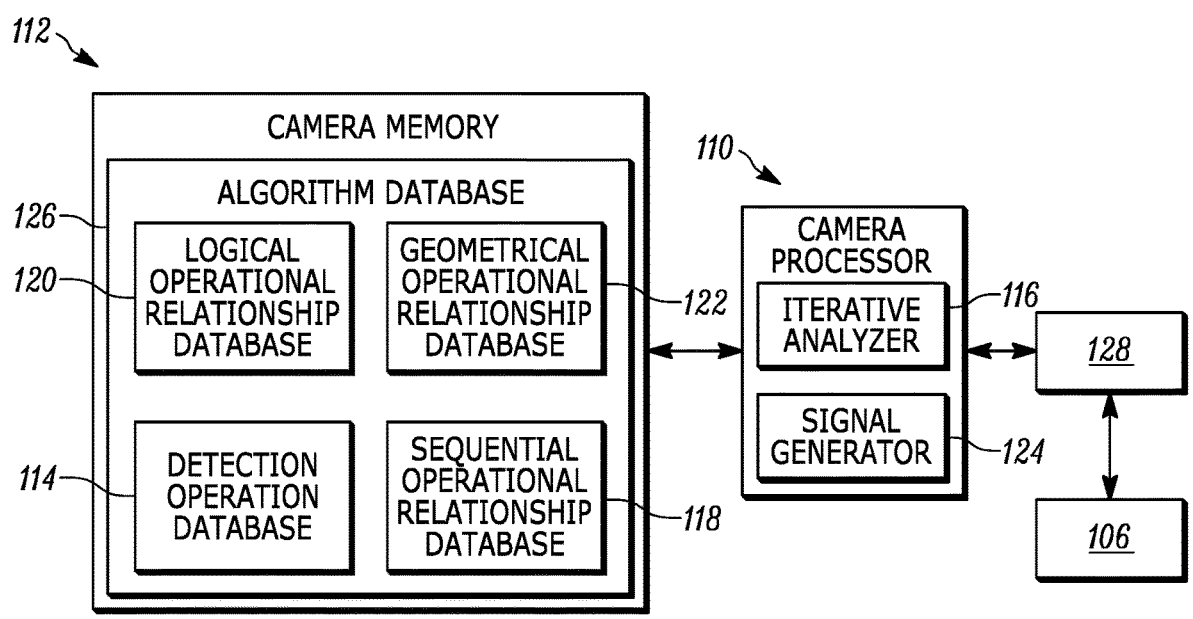
FIG. 1B illustrates a portion of an example system for a machine vision interface in accordance with various embodiments disclosed herein.

FIG. 1B illustrates a portion of an example system for a machine vision interface in accordance with various embodiments disclosed herein. The camera memory 112 includes an algorithm database 126. The algorithm database 126 includes a detection operation database 114, a sequential operational relationship database 118, a logical operational relationship database 120, and a geometrical operational relationship database 122.

The detection operation database 114 includes at least a plurality of detection operations. The plurality of detection operations are sent from the detection operation database 114 to the iterative analyzer 116. Each of the plurality of detection operations sent to the iterative analyzer 116 are associated with at least one of the one or more objects 106 in the optical FOV. However, it should be understood that, in certain embodiments, the detection operation database 114 may include detection operations that are not associated with any of the one or more objects 106 in the optical FOV.

For example, if the system 100 is configured to perform machine vision techniques on multiple distinct objects, then the detection operation database 114 may contain multiple distinct sets of detection operations related to each distinct object. In this example, for any one of the multiple distinct objects, the plurality of detection operations sent to the iterative analyzer 116 may not include every detection operation included in the detection operation database 114.

Each of the plurality of detection operations forms a portion of an algorithm provided to the iterative analyzer 116 by the algorithm database 126. For example, and as further discussed in reference to FIG. 2, if the system 100 attempts to process an image of a building, a detection operation from the plurality of operations may tell the iterative analyzer 116 to search for a window of the building. To further the example, a distinct detection operation from the plurality of operations may tell the iterative analyzer 116 to search for a door of the building.

The sequential operational relationship database 118 includes one or more sequential operational relationships. The one or more sequential operational relationships are sent from the sequential operational relationship database 118 to the iterative analyzer 116. Each of the one or more sequential operational relationships sent to the iterative analyzer 116 are associated with at least one of the one or more objects 106 in the optical FOV. However, it should be understood that, in certain embodiments, the sequential operational relationship database 118 may include sequential operational relationships that are not associated with any of the one or more objects 106 in the optical FOV.

For example, if the system 100 is configured to perform machine vision techniques on multiple distinct objects, then the sequential operational relationship database 118 may contain multiple distinct sets of sequential operational relationships related to each distinct object. In this example, for any one of the multiple distinct objects, the one or more sequential operational relationships sent to the iterative analyzer 116 may not include every sequential operational relationship included in the sequential operational relationship database 118.

Each of the one or more sequential operational relationships forms a portion of the algorithm provided to the iterative analyzer 116 by the algorithm database 126. For example, and as further discussed in reference to FIG. 2, if the system 100 attempts to process an image of a building, a sequential operational relationship from the one or more sequential operational relationships may tell the iterative analyzer 116 to search for a window of the building first, and look for a door of the building afterwards.

The logical operational relationship database 120 includes one or more logical operational relationships. The one or more logical operational relationships are sent from the logical operational relationship database 120 to the iterative analyzer 116. Each of the one or more logical operational relationships sent to the iterative analyzer 116 are associated with at least one of the one or more objects 106 in the optical FOV. However, it should be understood that, in certain embodiments, the logical operational relationship database 120 may include logical operational relationships that are not associated with any of the one or more objects 106 in the optical FOV.

For example, if the system 100 is configured to perform machine vision techniques on multiple distinct objects, then the logical operational relationship database 120 may contain multiple distinct sets of logical operational relationships related to each distinct object. In this example, for any one of the multiple distinct objects, the one or more logical operational relationships sent to the iterative analyzer 116 may not include every logical operational relationships included in the logical operational relationship database 120.

Each of the one or more logical operational relationships forms a portion of the algorithm provided to the iterative analyzer 116 by the algorithm database 126. For example, and as further discussed in reference to FIG. 2, if the system 100 attempts to process an image of a building, a logical operational relationship from the one or more logical operational relationships may tell the iterative analyzer 116 to search for a window of the building first, and if it does not find the window, to not look for a door of the building.

In various embodiments, the one or more logical operational relationships may include a logic gate between a first detection operation and a second detection operation. In these embodiments, the logic gate is configured to be changed by a user between an AND logic state and an OR logic state. Moreover, in these embodiments, the logic gate includes a default state corresponding to the AND logic state. Alternatively, in other embodiments, the logical operational relationship database 120 may include additional logic states, and the logic gate in these embodiments may be configured to allow a user to change among any of the available logic states.

It is to be understood that the logic states "AND" and "OR" as discussed herein are those that would be readily understood by one of ordinary skill in the art. It is also to be understood that the logical operation "NOT" can be applied to either operands of the "AND" and "OR" operations.

The geometrical operational relationship database 122 includes one or more geometrical operational relationships. The one or more geometrical operational relationships are sent from the geometrical operational relationship database 122 to the iterative analyzer 116. Each of the one or more geometrical operational relationships sent to the iterative analyzer 116 are associated with at least one of the one or more objects 106 in the optical FOV. However, it should be understood that, in certain embodiments, the geometrical operational relationship database 122 may include geometrical operational relationships that are not associated with any of the one or more objects 106 in the optical FOV.

For example, if the system 100 is configured to perform machine vision techniques on multiple distinct objects, then the geometrical operational relationship database 122 may contain multiple distinct sets of geometrical operational relationships related to each distinct object. In this example, for any one of the multiple distinct objects, the one or more geometrical operational relationships sent to the iterative analyzer 116 may not include every geometrical operational relationship included in the geometrical operational relationship database 122.

Each of the one or more geometrical operational relationships forms a portion of the algorithm provided to the iterative analyzer 116 by the algorithm database 126. For example, and as further discussed in reference to FIG. 2, if the system 100 attempts to process an image of a building, the iterative analyzer 116 may be instructed to search for a window of the building and to search for a door of the building afterwards. In this example, if the window is located, then based upon the location where the window was found, a geometrical operational relationship from the one or more geometrical operational relationships may tell the iterative analyzer 116 where to search for the door of the building.

The camera processor 110 includes an iterative analyzer 116. The iterative analyzer 116 is configured to perform an iterative analysis of the image received from the camera 102, as discussed below in reference to FIG. 3. To perform this iterative analysis, the iterative analyzer 116 receives the plurality of detection operations from the algorithm database 126. Additionally, the iterative analyzer 116 receives each of the one or more sequential operational relationships, one or more logical operational relationships, and one or more geometrical operational relationships from the algorithm database 126.

The camera processor 110 further includes a signal generator 124. The signal generator 124 sends a signal to the exterior component 128 to perform an action corresponding to the one or more objects 106 based on a final detection outcome.

Figure 2:
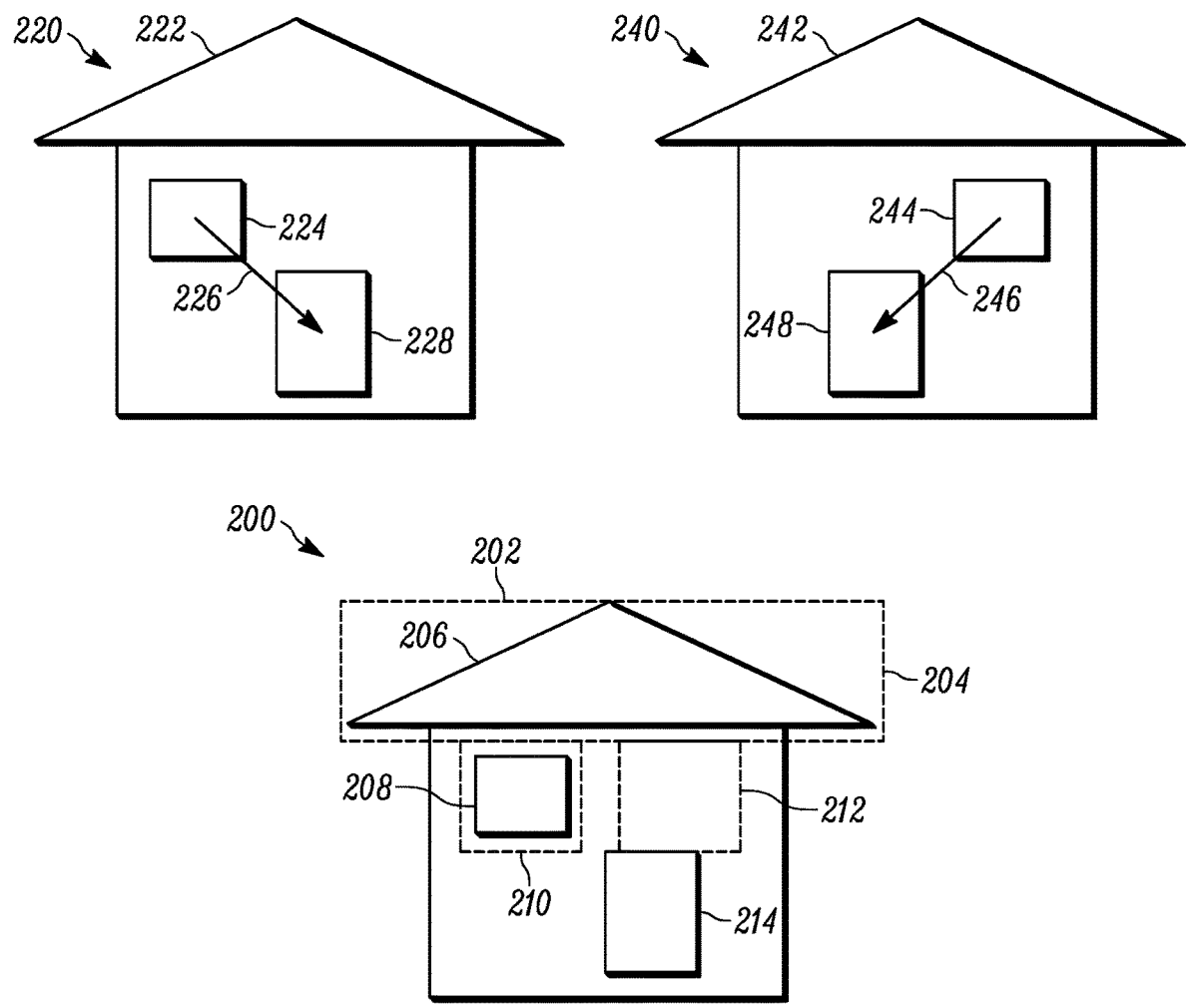
FIG. 2 illustrates several example analyses for a machine vision interface in accordance with various embodiments disclosed herein.

FIG. 2 illustrates several example analyses for a machine vision interface in accordance with various embodiments disclosed herein. The first example analysis 200 includes a first area of interest 204, a roof 206, a second area of interest 210, a third area of interest 212, a first window 208, a first door 214, and a first building image 202. In the first example analysis 200 the iterative analyzer 116 may analyze the first building image 202 by following a first detection operation and first sequential operational relationship to search for the roof 206 first. This instruction may be modified by a first geometrical operational relationship defining a first area of interest 204 surrounding the roof where the iterative analyzer 116 will perform its search for the roof 206. If the iterative analyzer 116 is successful in identifying the roof 206, then a second detection operation, a second sequential operational relationship, and a first logical operational relationship may instruct the iterative analyzer 116 to search for the first window 208.

The iterative analyzer 116 may next consider the second area of interest 210 to search for the first window 208 based on a second geometrical operational relationship and a corresponding detection operation, sequential operational relationship, and logical operational relationship. If the first window 208 is found in the second area of interest 210 (as illustrated in the first building image 202), a third geometrical operational relationship may adjust where the iterative analyzer 116 may search for the first door 214. However, if the first window 208 is not found in the second area of interest 210, for example the third window 244 in the third building image 242, the iterative analyzer 116 may then skip the next sequential step to search for the first door 214 to consider the third area of interest 212 in order to search for the first window 208. If the first window 208 is found in the third area of interest 212, a fourth geometrical relationship may adjust where the iterative analyzer 116 may search for the first door 214.

As previously described, the logical operational relationships between any two detection operations may be either "AND" or "OR", and may be modified by the "NOT" operation. Hence, any two detection operations logically connected by the "AND" logic gate must both be successful for the algorithm to continue.

In the previous example, the iterative analyzer's 116 search for the roof 206 in the first area of interest 204 (in this example, "the first search") may be logically connected to both the search for the first window 208 in the second area of interest 210 (in this example, "the second search") and the search for the first window 208 in the third area of interest 212 (in this example, "the third search") by the "AND" logic gate. Further in this example, the second search may be sequentially connected to a search for the first door 214 in a primary location (in this example, "the primary search"), and the third search may be sequentially connected to a search for the first door 214 in a secondary location (in this example, "the secondary search"). Even further in this example, the second search and the primary search (in this example, "the second search pair") may be connected by the "AND" logic gate, and the third search and the secondary search (in this example, "the third search pair") may be connected by the "AND" logic gate. Still in this example, the second search pair may be logically connected to the third search pair by the "OR" logic gate. In this way, the algorithm executed by the iterative analyzer 116 may fail if any of the first search, the third search, the primary search, or the secondary search fail.

The relative geometrical relationship between the areas of interests of sequential steps, as illustrated above, is adopted only for sequential steps which are connected by logical "AND" operations. In other words, a second sequential operation not connected to a first sequential operation by an "AND" operation does not have its area of interest modified by the operational result of the first sequential operation. For example, as discussed above, the third search pair is sequentially subsequent to the second search pair, and is logically connected to the second search pair by the "OR" logic operation. If the second search pair is unsuccessful, then the geometrical operational relationship connecting the third search and the secondary search of the third search pair will be unaffected by the second search pair's unsuccessful result.

In the second example analysis 220, the iterative analyzer 116 may be processing a second building image 222. In this example, the iterative analyzer 116 has identified a left window 224 on the left-hand side of the second building image 222. A geometrical operational relationship, derived from a template set up by the user through a user-interface (e.g., user interface 108), may act to direct the iterative analyzer's 116 search by indicating, with a right geometric vector 226, the likely location of a right door 228. Based on the right geometric vector 226, the iterative analyzer 116 may locate the right door 228 faster than if the algorithm proceeded without indicating the right geometric vector 226.

In this example, and in certain embodiments, the right geometric vector 226 may be derived from both a first location and first orientation of the left window 224. In other words, in this example, the geometrical operational relationship may indicate to the iterative analyzer 116 to search for the right door 228 in the second location identified by the right geometric vector 226 specifically because the first location and first orientation of the left window 224 indicate the second location likely includes the right door 228.

Similarly in this example, an area of interest containing the right door 228 (not shown) may be modified by the geometrical operational relationship based on the first location and first orientation of the left window 224. In other words, the area of interest containing the right door 228 might be tightly confined to a particular location because the first location and the first orientation of the left window 224 indicate the particular location likely includes the right door 228.

In the third example analysis 240 the iterative analyzer 116 may be processing a third building image 242. In this example, the iterative analyzer 116 has identified a right window 244 on the right-hand side of the third building image 242. A geometrical operational relationship may act to direct the iterative analyzer's 116 search by indicating, with a left geometric vector 246, the likely location of a left door 248. Based on the left geometric vector 246, the iterative analyzer 116 may locate the left door 248 faster than if the algorithm proceeded without indicating the left geometric vector 246.

In this example, and in certain embodiments, the left geometric vector 246 may be derived from both a first location and first orientation of the right window 244. In other words, in this example, the geometrical operational relationship may indicate to the iterative analyzer 116 to search for the left door 248 in a second location identified by the left geometric vector 246 specifically because the first location and first orientation of the right window 244 indicate the second location would be a likely includes the left door 248.

Similarly in this example, an area of interest containing the left door 248 (not shown) may be modified by the geometrical operational relationship based on the first location and first orientation of the right window 244. In other words, the area of interest containing the left door 248 might be tightly confined to a particular location because the first location and the first orientation of the right window 244 indicate the particular location likely includes the left door 248.

Figure 3:
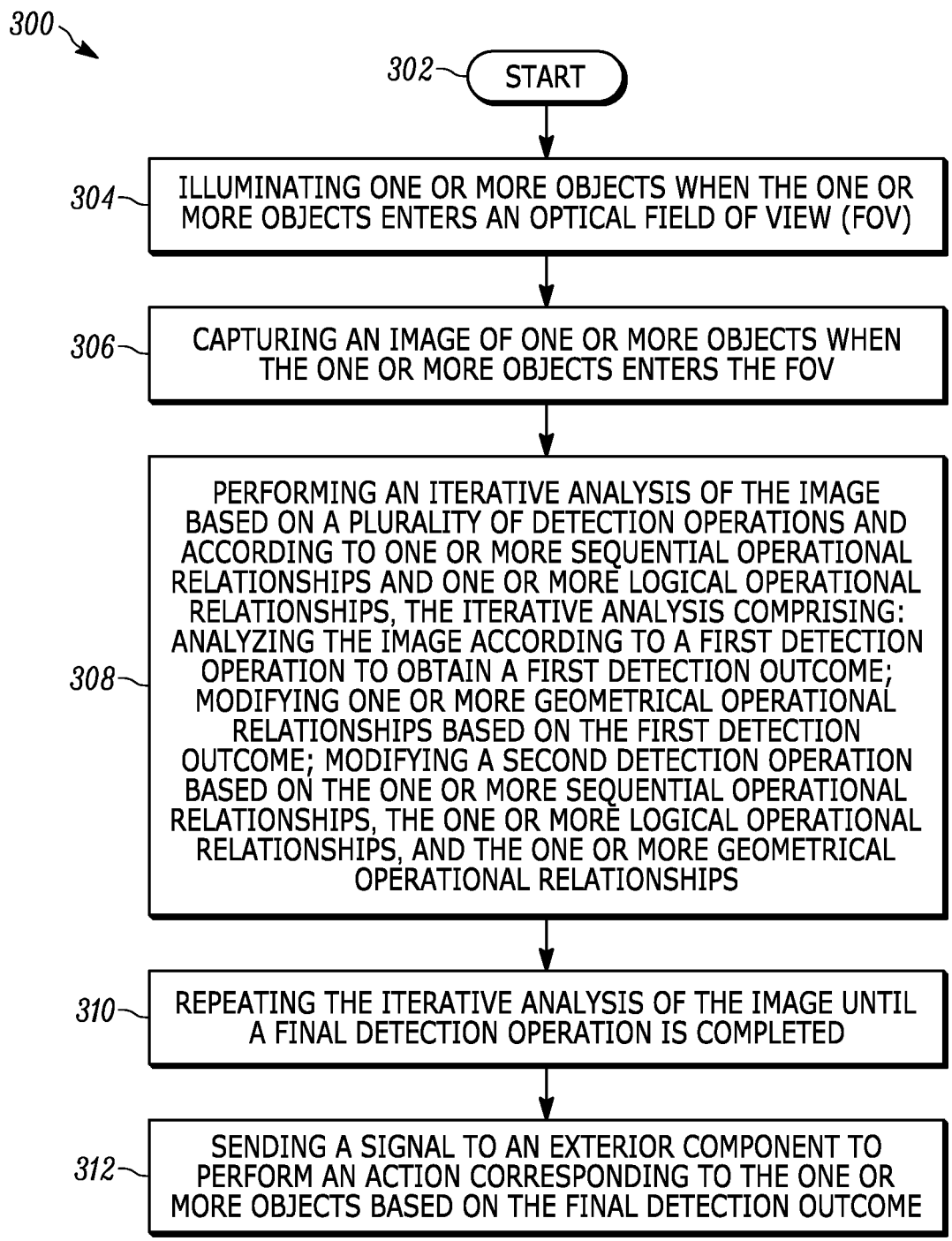
FIG. 3 illustrates an example method for a machine vision interface in accordance with various embodiments disclosed herein.

FIG. 3 illustrates an example method for a machine vision interface in accordance with various embodiments disclosed herein. Method 300 starts (302) at block 304, where, for example, a machine vision system (e.g., system 100) illuminates one or more objects 106 when the one or more objects 106 enters an optical FOV.

At block 306, method 300 includes capturing an image of one or more objects 106 when the one or more objects 106 enters the FOV.

At block 308, method 300 includes performing an iterative analysis of the image based on a plurality of detection operations and according to one or more sequential operational relationships and one or more logical operational relationships. The iterative analysis of block 308 comprises analyzing the image according to a first detection operation to obtain a first detection outcome. The iterative analysis of block 308 further comprises modifying one or more geometrical operational relationships based on the first detection outcome. The iterative analysis of block 308 further comprises modifying a second detection operation based on the one or more sequential operational relationships, the one or more logical operational relationships, and the one or more geometrical operational relationships.

At block 310, method 300 includes repeating the iterative analysis of the image until a final detection operation is completed.

At block 312, method 300 includes sending a signal to an exterior component 128 to perform an action corresponding to the one or more objects 106 based on the final detection outcome.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
  illuminating one or more objects when the one or more objects enters an optical field of view (FOV);
  capturing an image of one or more objects when the one or more objects enters the FOV;
  performing, by one or more processors, an iterative analysis of the image based on a plurality of detection operations and according to one or more sequential operational relationships and one or more logical operational relationships, wherein the plurality of detection operations are stored on a memory containing one or more databases, the iterative analysis comprising:
    analyzing the image according to a first detection operation to obtain a first detection outcome;
    modifying one or more geometrical operational relationships based on the first detection outcome; and
    modifying a second detection operation based on the one or more sequential operational relationships, the one or more logical operational relationships, and the one or more geometrical operational relationships;

repeating the iterative analysis of the image until a final detection operation is completed, wherein the iterative analysis of the image analyzes the image according to the second detection operation from a prior iteration of the iterative analysis, and wherein the analysis of the final detection operation produces a final detection outcome; and sending a signal to an exterior component to perform an action corresponding to the one or more objects based on the final detection outcome, wherein the one or more logical operational relationships include a logic gate between the first detection operation and the second detection operation, wherein the logic gate is configured to be changed by a user between an AND logic state and an OR logic state, and wherein the logic gate includes a default state corresponding to the AND logic state.

2. The method of claim 1, wherein the one or more sequential operational relationships include a sequence in which the plurality of detection operations will execute, and wherein the sequence is configured to be changed by a user.

3. The method of claim 1, further comprising:

skipping the second detection operation when the logic gate is in the default state and the first detection outcome indicates a failed detection corresponding to the first detection operation; and executing the second detection operation when at least one of:

the logic gate is in the default state and the first detection outcome indicates a successful detection corresponding to the first detection operation; or the user changes the logic gate to the OR logic state and the first detection outcome indicates an unsuccessful detection corresponding to the first detection operation.

4. The method of claim 1, wherein the one or more geometrical operational relationships include (i) a first area of interest corresponding to the first detection operation and (ii) a second area of interest corresponding to the second detection operation, wherein the first area of interest corresponds to a first geometrical region of the one or more objects, and wherein the second area of interest corresponds to a second geometrical region of the one or more objects.

5. The method of claim 4, further comprising:

modifying the second geometrical region according to each of a first location and a first orientation when the logic gate is in the default state and the first detection outcome indicates a successful detection corresponding to the first detection operation, and wherein the first geometrical region includes each of the first location and the first orientation.

6. The method of claim 1, wherein the image is captured with a camera and the one or more processors and the memory are contained in the camera.

7. The method of claim 1, wherein the illumination used is monochromatic.

8. The method of claim 1, wherein the illumination used is polychromatic.

9. The method of claim 1, wherein the exterior component is an actuator.

10. A system comprising:

a camera configured to capture an image of one or more objects when the one or more objects enters an optical field of view (FOV);

a memory including one or more databases;

an illumination unit configured to provide illumination of the one or more objects once the one or more objects enters the optical FOV; and one or more processors configured to:

receive the image of the one or more objects from the camera;

receive a plurality of detection operations from the memory;

perform an iterative analysis of the image based on the plurality of detection operations and according to one or more sequential operational relationships and one or more logical operational relationships, the iterative analysis comprising:

analyzing the image according to a first detection operation to obtain a first detection outcome;

modifying one or more geometrical operational relationships based on the first detection outcome; and modifying a second detection operation based on the one or more sequential operational relationships, the one or more logical operational relationships, and the one or more geometrical operational relationships;

repeat the iterative analysis of the image until a final detection operation is completed, wherein the iterative analysis of the image analyzes the image according to the second detection operation from a prior iteration of the iterative analysis, and wherein the analysis of the final detection operation produces a final detection outcome; and send a signal to an exterior component to perform an action corresponding to the one or more objects based on the final detection outcome, wherein the one or more logical operational relationships include a logic gate between the first detection operation and the second detection operation, wherein the logic gate is configured to be changed by a user between an AND logic state and an OR logic state, and wherein the logic gate includes a default state corresponding to the AND logic state.

11. The system of claim 10, wherein the one or more sequential operational relationships include a sequence in which the plurality of detection operations will execute, and wherein the sequence is configured to be changed by a user.

12. The system of claim 10 further comprising:

skipping the second detection operation when the logic gate is in the default state and the first detection outcome indicates a failed detection corresponding to the first detection operation; and executing the second detection operation when at least one of:

the logic gate is in the default state and the first detection outcome indicates a successful detection corresponding to the first detection operation; or the user changes the logic gate to the OR logic state, and the first detection outcome indicates an unsuccessful detection corresponding to the first detection operation.

13. The system of claim 10, wherein the one or more geometrical operational relationships may include (i) a first area of interest corresponding to the first detection operation and (ii) a second area of interest corresponding to the second detection operation, wherein the first area of interest corresponds to a first geometrical region of the one or more objects, and wherein the second area of interest corresponds to a second geometrical region of the one or more objects.

14. The system of claim 13, further comprising:
modifying the second geometrical region according to each of a first location and a first orientation when the logic gate is in the default state and the first detection outcome indicates a successful detection corresponding to the first detection operation, and
wherein the first geometrical region includes each of the first location and the first orientation.

15. The system of claim 10, wherein the one or more processors and the memory are contained in the camera.

16. The system of claim 10, wherein the illumination unit provides monochromatic illumination.

17. The system of claim 10, wherein the illumination unit provides polychromatic illumination.

18. The system of claim 10, wherein the exterior component is an actuator.

* * * * *